(12) United States Patent
Gupta et al.

(10) Patent No.: US 12,307,284 B2
(45) Date of Patent: May 20, 2025

(54) TRANSACTION ENGINE FOR EXECUTING TRANSACTIONS IN CLOUD AND ON-PREMISE ENVIRONMENTS

(71) Applicant: SAP SE, Walldorf (DE)

(72) Inventors: Manish Gupta, Bruchsal (DE);
Prothoma Sinha, Wiesloch (DE);
Showkath Ali Naseem, Bangalore (IN)

(73) Assignee: SAP SE, Walldorf (DE)

( * ) Notice: Subject to any disclaimer, the term of this patent is extended or adjusted under 35 U.S.C. 154(b) by 350 days.

(21) Appl. No.: 17/543,244

(22) Filed: Dec. 6, 2021

(65) Prior Publication Data
US 2023/0176895 A1 Jun. 8, 2023

(51) Int. Cl.
*G06F 9/46* (2006.01)
*G06F 9/50* (2006.01)

(52) U.S. Cl.
CPC ............ *G06F 9/466* (2013.01); *G06F 9/5038* (2013.01)

(58) Field of Classification Search
None
See application file for complete search history.

(56) References Cited

U.S. PATENT DOCUMENTS

| | | | | |
|---|---|---|---|---|
| 6,971,096 | B1* | 11/2005 | Ankireddipally | G06F 9/5038 |
| | | | | 707/999.1 |
| 7,925,665 | B2* | 4/2011 | Schneider | G06F 16/2471 |
| | | | | 707/774 |
| 9,632,828 | B1* | 4/2017 | Mehta | G06F 9/5011 |
| 10,733,057 | B2* | 8/2020 | Bentley | G06F 16/2379 |
| 2013/0104137 | A1* | 4/2013 | Fukuzaki | G06F 9/4887 |
| | | | | 718/102 |
| 2017/0060621 | A1 | 3/2017 | Whipple et al. | |
| 2017/0063615 | A1 | 3/2017 | Yang et al. | |
| 2018/0307514 | A1 | 10/2018 | Koutyrine et al. | |
| 2019/0281111 | A1* | 9/2019 | Yamamoto | G06F 3/1224 |
| 2020/0110528 | A1* | 4/2020 | Mak | G06F 3/0482 |
| 2023/0102134 | A1* | 3/2023 | Hervey | G06Q 20/202 |
| | | | | 705/21 |

OTHER PUBLICATIONS

"European Application Serial No. 22196294.7, Extended European Search Report mailed Apr. 25, 2023", 8 pgs.
"European Application No. 22196294.7 Communication pursuant to Rule 94(3) EPC mailed Feb. 20, 2025", 7 pgs.

* cited by examiner

*Primary Examiner* — Meng Ai T An
*Assistant Examiner* — Zujia Xu
(74) *Attorney, Agent, or Firm* — SCHWEGMAN LUNDBERG & WOESSNER, P.A.

(57) ABSTRACT

Various examples are directed to systems and methods for executing transactions in a hybrid computing environment. A volume transaction engine may receive first transaction request data from a first transaction platform application and select transaction description data describing a plurality of process operations for executing the first transaction. The volume transaction engine may execute the first process operation at least in part by accessing a first backend system executing at the cloud platform deployment and execute a second process operation at least in part by accessing a second backend system executed by an on-premise computing system.

10 Claims, 7 Drawing Sheets

TRANSACTION ENGINE FOR EXECUTING TRANSACTIONS IN CLOUD AND ON-PREMISE ENVIRONMENTS

BACKGROUND

Traditionally, software, including software for managing business enterprises, has been self-contained and executed at one or more local machines making up an on-premise computing system. An enterprise desiring to use a software tool builds an on-premise computing system and executes a software application to provide the tool on that computing system. Cloud computing has disrupted this paradigm. Cloud computing allows enterprises to supplement or replace on-premise computing systems with cloud software, platforms, and even computing infrastructure provided as a service.

BRIEF DESCRIPTION OF DRAWINGS

The present disclosure is illustrated by way of example and not limitation in the following figures.

DETAILED DESCRIPTION

Figure 1:
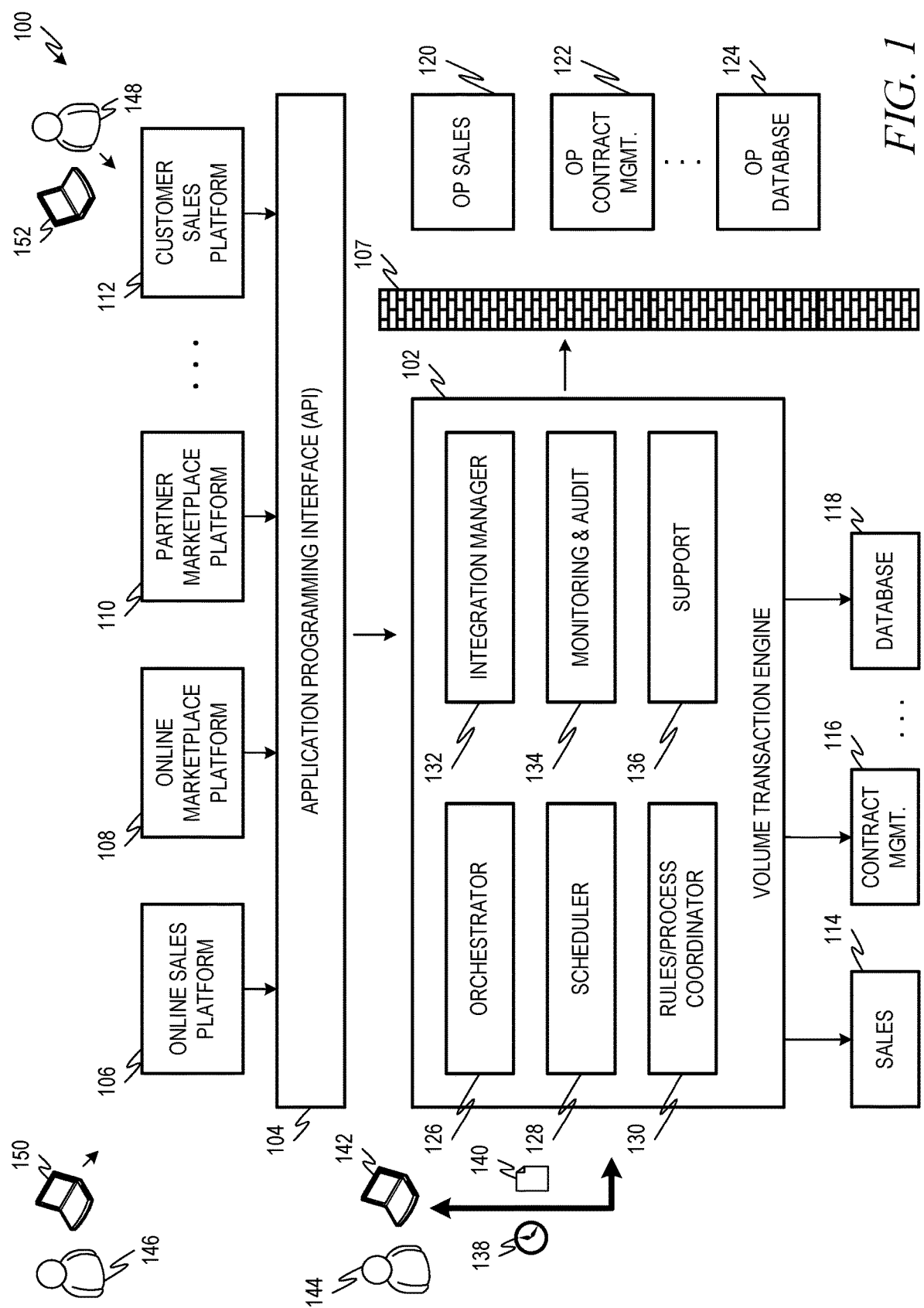
FIG. 1 is a diagram showing one example of an arrangement for executing transactions in a hybrid computing environment.

Computing system arrangements are used to execute and manage transactions such as, for example, sales transactions in a business enterprise setting. For example, a procurement or Supplier Resource Management (SRM) system may manage transactions with enterprise suppliers for procuring raw materials and inventory. A product lifecycle management (PLM) system may manage transactions and processes related to the lifecycle of a good or service including, for example, the acquisition and transport of raw materials, scheduling of manufacturing tasks, and the like. A supply chain management (SCM) system may manage warehouse operations including, for example, movement of products and raw materials. A customer relationship management (CRM) system may store and optimize the use of customer information and interactions. A sales system may manage transactions for the sale of goods or services such as, for example, placing orders, scheduling deliveries or shipments, handling invoicing, etc. These and various other systems may be accessed or otherwise used for management of the transactions of an enterprise, including sales transactions.

In some examples, some or all of the software solutions and systems for managing transactions is executed as on-premise software applications. An on-premises software application is typically executed by a computing system built by an enterprise on-site or on-premises. An on-premises application may be implemented to include a set of one or more executables, libraries, and the like, that are implemented by a set of executable files, libraries, and the like that are resident at the on-premises computing system. Users associated with the enterprise access the software application from the on-premises computing system.

When an enterprise maintains and performs business transaction management using on-premise applications executing at an on-premise computing system, coordination and communication between various different components may be manageable. For example, administrative users of the on-premise computing system may be responsible for (and may have direct access to) all of the software applications as well as to the hardware for executing the software applications and persisting transaction data.

In some examples, it is desirable to execute some or all of the functionality for performing transaction management as cloud applications that execute in a cloud environment. A cloud environment includes one or more data centers implementing one or more virtual and/or hardware servers. For example, an instance of a cloud application may execute to provide a software tool to a group of users (e.g., a group of users associated with an entity that purchases access to the software tool). Each instance of the cloud application comprises a set of one or more virtual machines and/or containers executing at the cloud environment.

Cloud applications can provide various advantages to enterprises. In some examples, a cloud application is implemented according to a Software as a Service (SaaS) model where a tenant enterprise purchases access to the cloud application from a provider enterprise. This may limit or sometimes eliminate the need for the tenant enterprise to manage implementation details for the application, such as, for example, managing processing and data storage hardware and the like.

The increasing use of cloud applications by business enterprises has introduced complexity to transaction management. For example, an enterprise may implement transactions in a distributed or hybrid computing environment, where some components of the transaction process flow are executed at one location, such as at an on-premise computing system, and other components of the transaction process flow are executed at another location, such as SaaS applications implemented in a cloud environment. This may lead to increased communications and coordination between various on-premise and cloud-implemented applications. Consider an example in which an enterprise implements a sales system with an on-premise application and a CRM system using a cloud tenancy. Conducting a sales transaction may include querying and/or updating the CRM as well as, for example, generating a sales order using the on-premise sales system.

In some examples, too, it may be desirable to implement sales platform applications at multiple different computing system locations. For example, a first enterprise may desire to have one sales platform application executing at an on-premise computing system and another that is cloud implemented. Also, in some examples, it is desirable for an enterprise to support partner enterprises who desire to sell products or services for the enterprise. For example, a partner enterprise may execute a sales platform application that can initiate and/or manage sales transactions for the first enterprise.

In distributed or hybrid sales transaction process, where two or more of the applications for processing a transaction are implemented at different computing systems, it can be difficult to set-up and modify transaction processes. For example, a sales platform application may coordinate with multiple on-premise and/or cloud implemented components, leading to increased complexity in the sales platform itself. Further, when multiple sales platform applications are implemented, each sales platform application may be programmed to communicate and coordinate with multiple different and distributed components. This can create challenging scenarios when it is desirable to modify a transaction flow, as making a change to a transaction flow may include modifying multiple different sales platform applications.

Various examples address these and other challenges utilizing a volume transaction engine. The volume transaction engine may be in communication with one or more sales platform applications. The sales platform applications may make transaction requests to the volume transaction engine via an application programming interface (API). The volume transaction engine may execute a plurality of process operations for implementing the transactions. Executing the process operations may include communicating with various different components implemented at different computing systems, such as cloud environments and/or on-premise computing systems.

FIG. 1 is a diagram showing one example of an arrangement 100 for executing transactions in a hybrid computing environment. The arrangement 100 comprises a volume transaction engine 102 in communication with various sales platform applications 106, 108, 110, 112 via an API 104. The volume transaction engine 102 may be implemented at any suitable computing environment including, for example, at a cloud environment and/or at an on-premise computing system. In the example of FIG. 1, the volume transaction engine 102 comprises various services including an orchestrator service 126, a scheduler service 128, a rules/process coordinator service 130, an integration manager service 132, a monitoring and audit service 134, and a support service 136.

The volume transaction engine 102 is also in communication with various backend systems 114, 116, 118, 120, 122, 124. The backend systems include cloud backend systems 114, 116, 118 and on-premise backend systems 120, 122, 124. The cloud backend systems 114, 116, 118 include applications implemented in a cloud environment. In some examples, the cloud backend systems 114, 116, 118 include applications executed in the same cloud environment as the volume transaction engine 102 and/or in different cloud environments. The on-premise backend systems 120, 122, 124 include applications executed at one or more on-premise computing systems. In some examples, the volume transaction engine 102 is in communication with the on-premise backend systems 120, 122, 124 via a firewall 107. For example, the firewall 107 may be implemented by a suitable cloud connector application for connecting a cloud-implemented application to an on-premise executed application. Also, although not shown in FIG. 1, in some examples, the volume transaction engine 102 may also utilize a firewall when communicating with cloud backend systems 114, 116, 118 if the cloud backend system 114, 116, 118 is implemented at a different environment than the volume transaction engine 102.

In the example of FIG. 1, the cloud backend systems 114, 116, 118 include a sales backend system 114, a contract management backend system 116, and a database backend system 118. It will be appreciated, however, that various other cloud backend systems (not shown) may be used for transaction processing. Also, in the example of FIG. 1, the on-premise backend systems include a sales backend system 120, a contract management backend system 122, and a database backend system 124, although various other on-premise backend systems may be used.

The arrangement 100 also includes various sales platform applications 106, 108, 110, 112. The sales platform applications 106, 108, 110, 112 may be implemented by the enterprise that is selling goods and services and/or by a partner enterprise. The sales platform applications 106, 108, 110, 112 may be configured to interact with customer users 146 and/or salesperson users 148 to initiate sales or other transactions. Although one customer user 146 and one salesperson user 148 are shown in FIG. 1, it will be appreciated that multiple customer users 146 and/or multiple salesperson user 148 may utilize some or all of the various sales platform applications 106, 108, 110, 112. The customer users 146 and salesperson users 148 may utilize user computing devices 150, 152 to access the sales platform applications 106, 108, 110, 12. The user computing devices 150, 152 may be or include any suitable computing device such as, for example, a table computer, a mobile phone computing device, a laptop computer, a desktop computer, and the like.

In some examples, one or more of the sales platform applications 106, 108, 110, 112 provide a customer user interface to one or more customer users 146 (via user computing devices such as the user computing device 150). The customer user 146 may provide information regarding a sales transaction that may involve, for example, the provision of goods and/or services to the customer user 146 or an associated enterprise.

Also, in some examples, some or all of the sales platform applications 106, 108, 110, 112 provide a user interface to one or more salesperson users 148. The salesperson users 148 may be associated with the enterprise implementing the volume transaction engine 102 and/or another entity. Salesperson users 148 may access one or more of the sales platform applications 106, 108, 110, 112 and provide details of a proposed sale of goods and/or services to a customer.

A sales platform application 106, 108, 110, 112 may generate transaction request data describing a requested transaction. For example, a sales platform application 106, 108, 110, 112 may interact with a customer user 146 and/or a salesperson user 148 to receive an indication of a requested sales transaction. For example, the sales transaction may include a sale of goods and/or services to a customer (e.g., a customer user 146 or other customer). The sales platform application 106, 108, 110, 112 may generate the transaction request data based on the interaction with the customer user and/or salesperson user.

The sales platform application 106, 108, 110, 112 may provide the transaction request data to the API 104. The transaction request data describes a requested transaction. In some examples, the sales platform applications 106, 108, 110 are configured to format and/or arrange the transaction request data in a format that is readable by the API 104. The API 104 forwards the transaction request data to the volume transaction engine 102.

The orchestrator service 126 may receive the transaction request data and select transaction description data for executing the transaction. The transaction description data describes a set of process operations that are to be executed to implement the transaction. The transaction description data, in some examples, is stored at a backend system 114, 116, 118, 120, 122, 124. The orchestrator service 126 may be programmed to select the appropriate backend system 114, 116, 118, 120, 122, 124 and query that backend system to obtain the transaction description data.

The integration manager service 132 may be programmed to interface with the various backend systems 114, 116, 118, 120, 122, 124. For example, the orchestrator service 126 may query the integration manager service 132 to access the backend system 114, 116, 118, 120, 122, 124 storing the transaction description data, prompting the integration manager service 132 to retrieve the transaction description data.

The integration manager service 132 may be programmed with the implementation location and access details of the various backend systems 114, 116, 118, 120, 122, 124. For example, the integration manager service 132 may be programmed to interface with the firewall 107 (and/or a cloud connector application implementing the firewall 107) to access the on-premise backend systems 114, 116, 118, 120, 122, 124. The integration manager service 132 may also be programmed to interface with various cloud-implemented backend systems 114, 116, 118.

The transaction description data may describe a plurality of process operations for executing the requested transaction. Consider an example sales transaction. A first process operation may include accessing a CRM backend system application to query for customer data describing a customer for the requested transaction. If the customer data indicates that the customer is suitable for the transaction, a second process operation may involve accessing an accounting backend system to generate an invoice. Other process operations may involve, for example, generating a note to extend credit to the customer (if relevant), interfacing with an SCM backend system to prepare for and/or schedule manufacturing of a good or goods and/or the provision of a service, etc. The orchestrator service 126 may coordinate execution of the process operations.

The scheduler service 128 may generate a schedule for performing the process operations of the transactions. The schedule may be generated before the process operations are performed and may have a schedule time for some or all of the process operations. In some examples, the scheduler operation executes upon the completion of one process operation to determine a scheduled time for the next process operation.

In some examples, the monitoring and audit service 134 monitors the execution of process operations of the transaction. For example, upon completion of a process operation, the monitoring and audit service 134 may generate object identifier data describing the completed process operation. The integration manager service 132 may write the object identifier data to a persistence associated with the volume transaction engine 102. The persistence may be a local persistence at the cloud or other environment implementing the volume transaction engine 102 and/or may be at one or more of the backend systems 114, 116, 118, 120, 122, 124. The monitoring and audit service 134, in some examples, also generates object identifier data describing process operations that do not complete, for example, due to an error or other abnormality. Object identifier data describing an incomplete process operation may also be written to the persistence associated with the volume transaction engine 102.

A rules/process coordinator service 130 may be in communication with an administrative user 144 via a user computing device 142. The user computing device 142 may be similar to the user computing devices 150, 152. The administrative user 144 may provide process operation data 140 that provides a description of process operations for a new transaction and/or modifies the process operations of an existing transaction. In some examples, the rules/process coordinator service 130 also provides the administrative user 144 with one or more notifications 138. Notifications 138 may indicate the status of a transaction including, for example, whether the transaction succeeded or failed.

Figure 2:
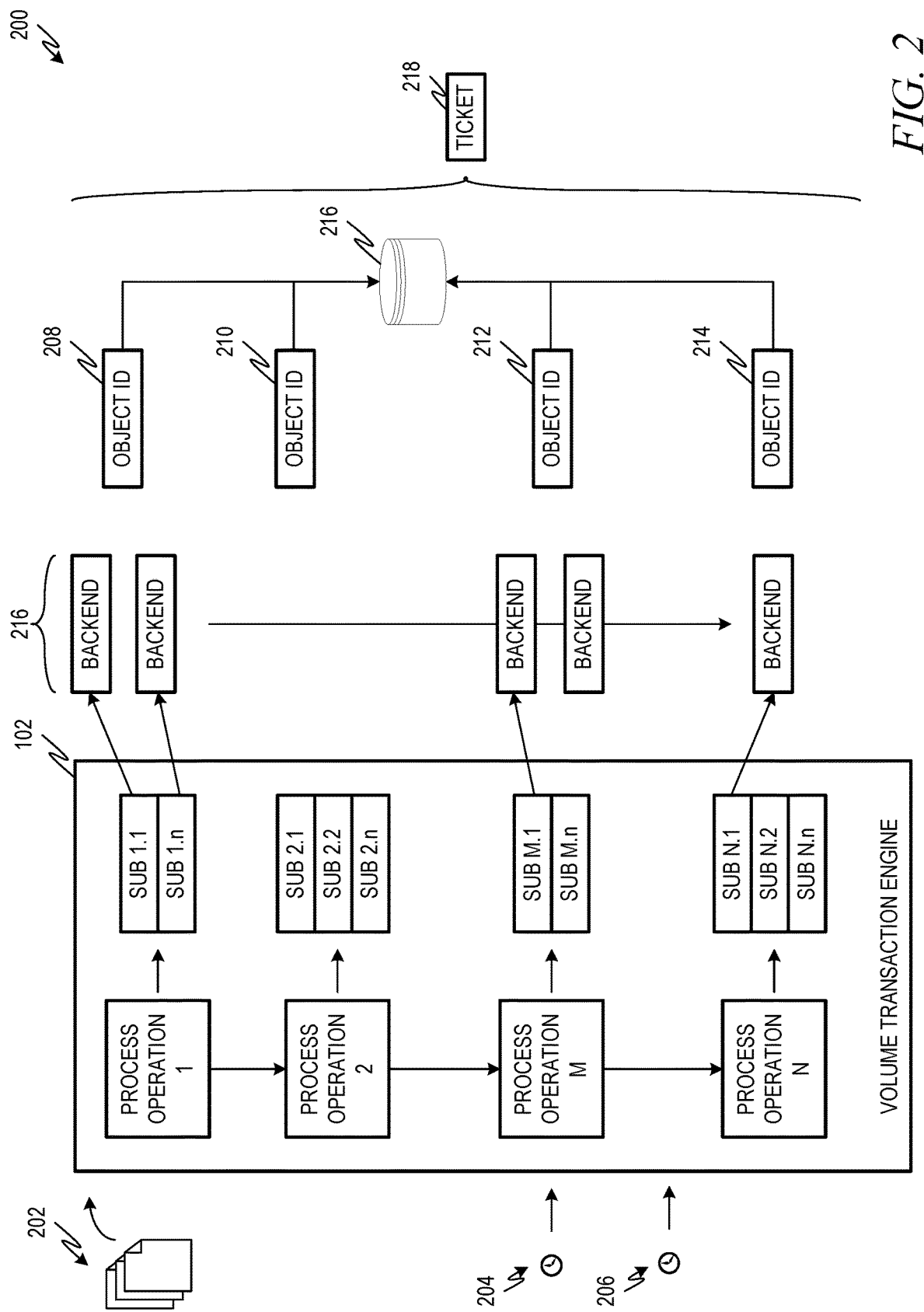
FIG. 2 is a workflow diagram showing one example of a workflow that may be executed using the volume transaction engine of FIG. 1.

FIG. 2 is a workflow diagram showing one example of a workflow 200 that may be executed using the volume transaction engine 102 of FIG. 1. In this example, the volume transaction engine 102 executes a transaction comprising N process operations. The volume transaction engine 102 (e.g., the orchestrator service 126 via the integration manager service 132) retrieves transaction description data 202. The transaction description data 202 describes the process operations 1-N that are executed by the volume transaction engine 102 to execute the transaction. In this example, the transaction description data 202 also describes notifications 204, 206. Notifications 204, 206 may be sent by the volume transaction engine 102 to one or more administrative users 144 upon the completion of a process operation and/or as described herein. For example, the transaction description data 202 may describe a notification 204 that is to be sent to one or more administrative users 144 upon the completion of a process operation M and a notification 206 that is to be sent to one or more administrative users 144 upon the completion of the process operation N.

In the example of FIG. 2, the process operations 1, 2, M, N are divided into various suboperations. For example, the process operation 1 comprises suboperations 1.1 through 1.$n$. The process operation 2 comprises suboperations 2.1 through 2.$n$. The process operation M comprises suboperations M.1 through M.n. The process operation N comprises suboperations N.1 through N.n.

In the example of FIG. 2, the various process operations involve reading from and/or writing to one or more of the backend systems 114, 116, 118, 120, 122, 124 (shown generally as 216 in FIG. 2). For example, some process operations may read data from a backend system 114, 116, 118, 120, 122, 124. Consider an example process operation or suboperation that involves checking a backend CRM system to determine whether a customer is suitable for a sales transaction. The volume transaction engine may query the CRM system to receive past sales and/or payment records for the customer to determine whether the customer is suitable for a requested sales transaction. Object identifier data for the process operation or suboperation may include a record of the read from the CRM system.

In some examples, a process operation or suboperation generates process operation result data that is written to a backend system 114, 116, 118, 120. Consider another example process operation or suboperation that is to generate a sales order for a sale. The process operation or suboperation may generate data describing the desired sales order and provide the sales order data to an appropriate backend system, which may generate the sales order.

In some examples, the transaction description data 202 may also describe, for each process operation and/or suboperation, which backend system or systems are to be interfaced in association with the process operation. Upon completion of an interface with a backend system, the volume transaction engine 102 may generate object identifier data 208, 210, 212, 214. The object identifier data 208, 210, 212, 214 may describe an access of a backend system. The integration manager service 132 may write the object identifier data 208, 210, 212, 214 to a persistence 216 associated with the volume transaction engine 102, which may be, for example, at one or more of the backend systems 114, 116, 118, 120.

If an exception occurs during the one or more of the process operations 1-N, the volume transaction engine 102 may generate exception ticket data 218. The exception ticket data 218 may describe the exception including, for example, the process operation and/or suboperation where the exception occurred. In some examples, the exception ticket data 218 may indicate a backend system or systems that was accessed or was to be accessed by process operation and/or suboperation that is the subject of the exception. The exception ticket data 218 may also be written to the persistence 216.

Figure 3:
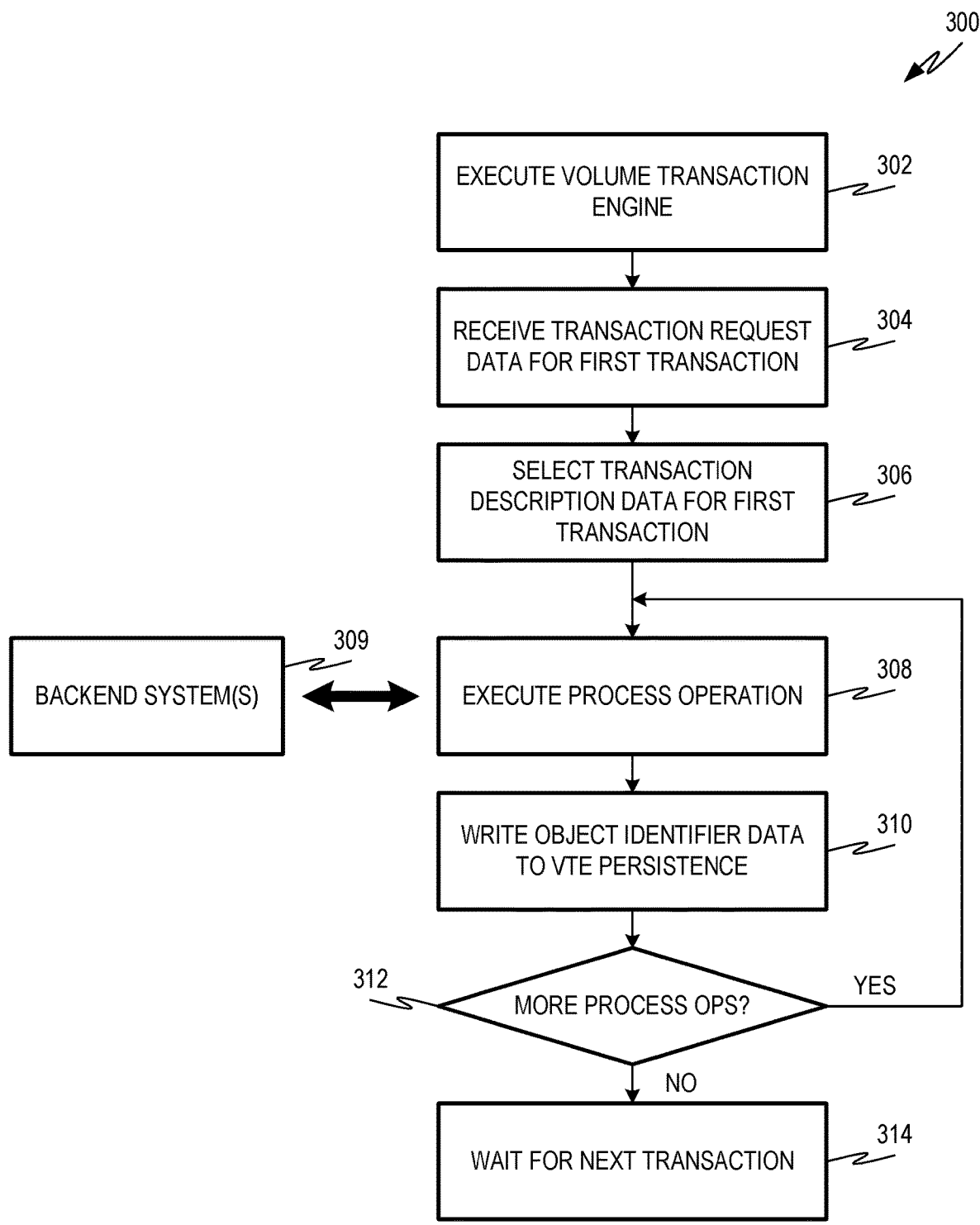
FIG. 3 is a flowchart showing one example of a process flow for executing a transaction using the volume transaction engine.

FIG. 3 is a flowchart showing one example of a process flow 300 for executing a transaction using the volume transaction engine 102. At operation 302, a cloud environment executes the volume transaction engine 102. In some examples, the volume transaction engine 102 is configured according to a microservice architecture. For example, the volume transaction engine 102 is implemented by a collection of loosely-coupled microservices executing at the cloud environment. Each microservice may also include a single executable that executes in a separate virtual machine (VM) or container implemented by the cloud environment. Individual microservices may be programmed to perform a defined task or small set of tasks and interact with the other microservices in a defined way, for example, according to an application programming interface (API). In some examples, the various services 126, 128, 130, 132, 134, 136 of the volume transaction engine 102 are implemented as microservices. Executing the volume transaction engine 102 may include spinning up one or more containers for executing one or more microservices or other components making up the volume transaction engine 102.

At operation 304, the volume transaction engine 102 receives transaction request data describing a first transaction. The transaction request data may be received, for example, from a sales platform application, such as one of the sales platform applications 106, 108, 110, 112 of FIG. 1. At operation 306, the volume transaction engine 102 (e.g., the orchestrator service 126 thereof) uses the transaction request data to select transaction description data for the transaction.

At operation 308, the volume transaction engine 102 executes a first process operation of the transaction, for example, as described by the transaction description data. Executing the process operation may include interacting with one or more backend systems 309, for example, using the integration manager service 132. At operation 310, the volume transaction engine 102 (e.g., the integration manager service 132) writes object identifier data to the persistence associated with the volume transaction engine 102. The object identifier data describes the interaction between the volume transaction engine 102 and the relevant backend system 309 during execution of the process operation. As described herein, the interaction with the backend system may include one or more read operations and/or one or more write operations. Also, in some examples, executing a process operation may include interacting with more than one backend system 309. In these examples, the integration manager service 132 may generate and store multiple instances of object identifier data and/or may generate and store object identifier data describing interactions with more than one backend system 309.

At operation 312, the volume transaction engine 102 determines if the transaction description data includes additional process operations. If yes, the volume transaction engine 102 may execute the next process operation at operation 308. If no more process operations remain in the transaction, the volume transaction engine 102 may wait for a next transaction at operation 314.

Figure 4:
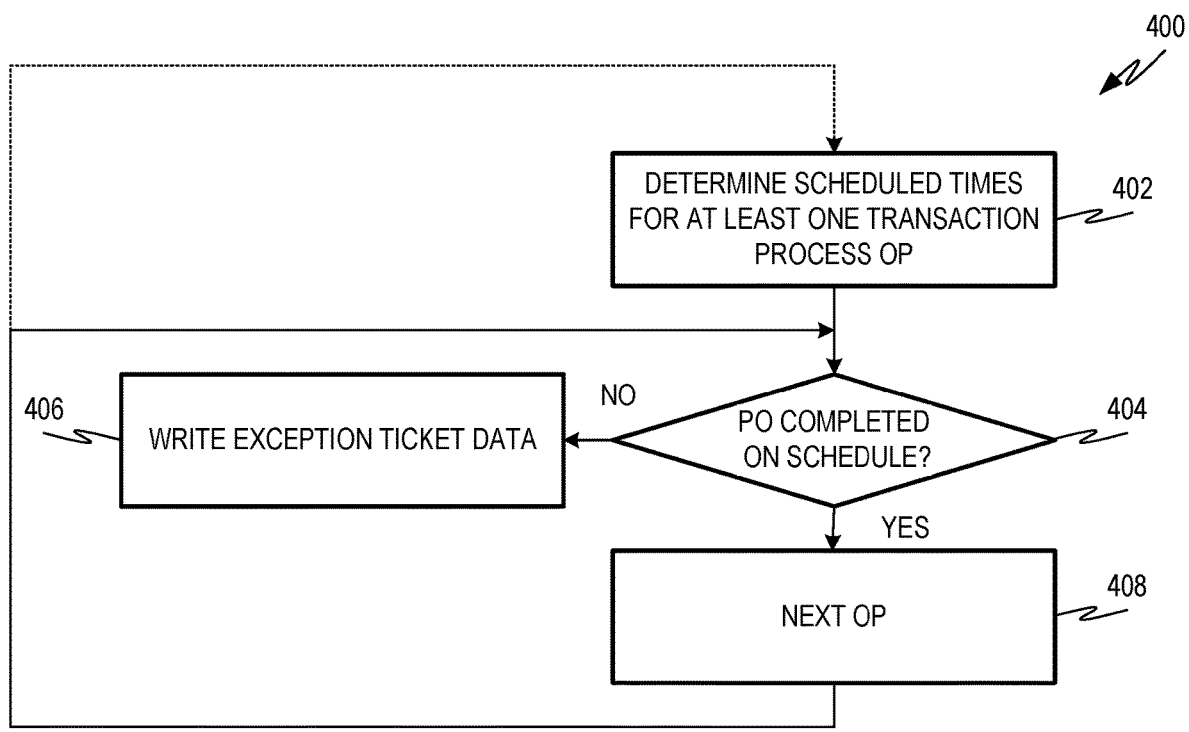
FIG. 4 is a flowchart showing one example of a process flow that may be executed by the volume transaction engine of FIG. 1.

FIG. 4 is a flowchart showing one example of a process flow 400 that may be executed by the volume transaction engine 102 of FIG. 1 (e.g., the monitoring and audit service 134 thereof) to monitor process operations of a transaction. At operation 402, the volume transaction engine 102 (e.g., the monitoring and audit service 134 thereof) determines a scheduled time for at least one transaction process operation. The scheduled time indicates, for example, when the process operation is expected or scheduled to be completed. In some examples, determining a scheduled time for a process operation includes generated scheduled times for one or more suboperations of the process operation.

In some examples, the operation 402 is performed for a single process operation and/or for multiple process operations. In some examples, the volume transaction engine 102 may generate a scheduled time for each process operation of a transaction before or near the time that the volume transaction engine 102 begins to execute the transaction. In some examples, the volume transaction engine 102 generates a scheduled time for a process operation after a previous process operation has completed.

At operation 404, the volume transaction engine 102 (e.g., the monitoring and audit service 134 thereof) determines if a first process operation of the transaction is completed on schedule. If the first process operation is completed on schedule, the volume transaction engine 102 may consider a next operation at operation 408. The volume transaction engine 102 (e.g., the monitoring and audit service 134 thereof) may, in some examples, return to operation 402 and determine a scheduled time for the next process operation. If, in some examples, the volume transaction engine 102 has already generated a scheduled time for the next process operation, the volume transaction engine 102 may determine, at operation 404, whether the next process operation of the transaction is completed on schedule.

If, at operation 404, the volume transaction engine 102 (e.g., the monitoring and audit service 134 thereof) determines that a process operation of the transaction is not completed on schedule, it may generate and write exception ticket data at operation 406. The exception ticket data may be written to the persistence associated with the volume transaction engine 102 as described herein.

Figure 5:
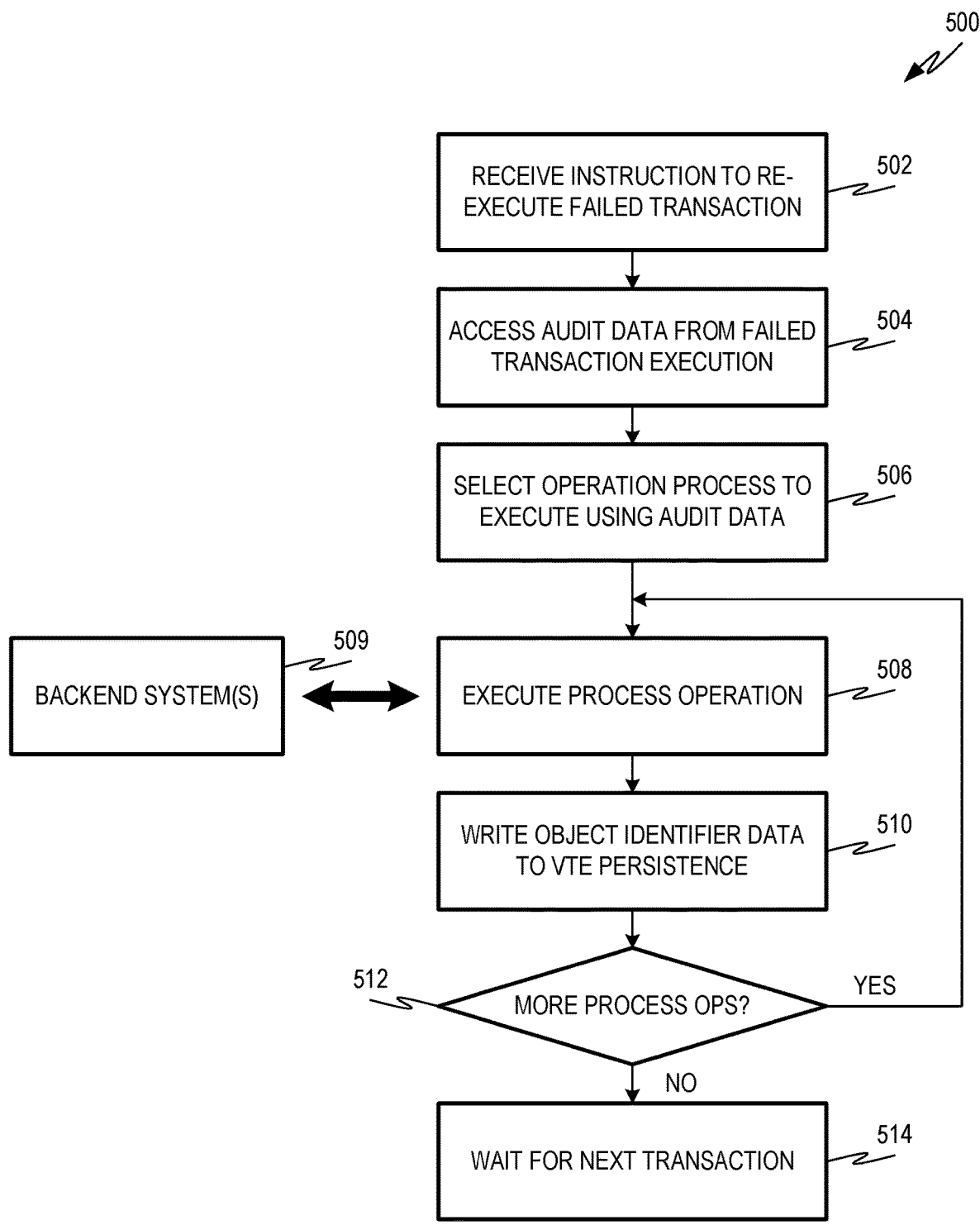
FIG. 5 is a flowchart showing one example of a process flow that may be executed by the volume transaction engine of FIG. 1.

In various examples, the volume transaction engine utilizes 102 audit data generated during a failed transaction to re-execute the failed transaction. The audit data can include exception ticket data and/or object identifier data. FIG. 5 is a flowchart showing one example of a process flow 500 that may be executed by the volume transaction engine 102 of FIG. 1 to re-execute a previously-failed transaction.

At operation 502, the volume transaction engine 102 receives an instruction to re-execute a failed transaction. Instruction may be generated by the sales platform application 106, 108, 110, 112 that initially requested the transaction and/or may be generated automatically in response to the failure of the failed transaction. At operation 504, the volume transaction engine 102 accesses audit data describing the failed transaction. The audit data may include, for example, object identifier data written after successfully-completed process operations and/or suboperations of the transaction and/or exception ticket data describing one or more failed process operations or sub-operations.

Using the audit data, the volume transaction engine 102 may, at operation 506, select a process operation to execute. For example, the volume transaction engine 102 may not re-execute some or all of the process operations of the transaction that were previously executed successfully, for example, as indicated by object identifier data. In some examples, the volume transaction engine 102 may select the first process operation that was not successfully executed previously, as indicated by the object identifier data and the exception ticket data. In some examples, the volume transaction engine 102 may select a suboperation of the previously-failed operation, where the suboperation is the first sub-operation that was not successfully completed in the prior execution of the transaction.

At operation 508, the volume transaction engine 102 executes the process operation selected at operation 506. This may include interacting with one or more backend systems 509. At operation 510, the volume transaction engine 102 (e.g., the integration manager service 132) writes object identifier data to the persistence associated with the volume transaction engine 102. The object identifier data describes the interaction between the volume transaction engine 102 and the relevant backend system 509 during execution of the process operation.

At operation 512, the volume transaction engine 102 determines if the transaction description data includes additional process operations. If yes, the volume transaction engine 102 may execute the next process operation at operation 508. If no more process operations remain in the transaction, the volume transaction engine 102 may wait for a next transaction at operation 514.

In view of the disclosure above, various examples are set forth below. It should be noted that one or more features of an example, taken in isolation or combination, should be considered within the disclosure of this application.

Examples

Example 1 is a system, comprising: a cloud platform deployment programmed to execute a volume transaction engine to perform operations comprising: receiving first transaction request data from a first transaction platform application, the first transaction request data describing a first transaction; selecting transaction description data describing a plurality of process operations for executing the first transaction, the transaction description data describing a first process operation and a second process operation; executing the first process operation, the executing of the first process operation comprising accessing a first backend system executing at the cloud platform deployment; writing first object identifier data to a persistence associated with the volume transaction engine, the first object identifier data describing the accessing of the first backend system; executing the second process operation, the executing of the second process operation comprising accessing a second backend system executed by an on-premise computing system; and writing second object identifier data to the persistence associated with the volume transaction engine, the second object identifier data describing the accessing of the first backend system.

In Example 2, the subject matter of Example 1 optionally includes wherein the volume transaction engine further comprises a scheduler service, and wherein the transaction description data further describes a third process operation and a fourth process operation, the operations further comprising: determining, by the scheduler service, a scheduled time for the third process operation and a scheduled time for the fourth process operation; executing the third process operation, by the volume transaction engine; determining, by the scheduler service, that the third process operation has failed to complete before the scheduled time for the fourth process operation; and writing exception ticket data to the persistence associated with the volume transaction engine, the exception ticket data describing the third process operation and the fourth process operation.

In Example 3, the subject matter of Example 2 optionally includes the operations further comprising: receiving, by the volume transaction engine, a request to re-execute the first transaction; accessing, by the volume transaction engine, the first object identifier data, the second object identifier data, and the exception ticket data; using, by the volume transaction engine, the first object identifier data, the second object identifier data, and the exception ticket data, to select the third process operation for execution; and executing, by the volume transaction engine, the third process operation.

In Example 4, the subject matter of any one or more of Examples 1-3 optionally includes the first transaction request data being received by the volume transaction engine via a transaction engine application programming interface (API).

In Example 5, the subject matter of any one or more of Examples 1-4 optionally includes the operations further comprising receiving, by the volume transaction engine, second transaction request data from a second transaction platform application, the second transaction request data describing a second transaction.

In Example 6, the subject matter of any one or more of Examples 1-5 optionally includes the operations further comprising a process coordinator service, the operations further comprising: receiving, by the process coordinator service, input data from an administrative user; and generating, by the process coordinator service, the transaction data based at least in part on the input data.

In Example 7, the subject matter of any one or more of Examples 1-6 optionally includes the operations further comprising: receiving, by a process coordinator service, update data from an administrative user, the update data describing a change to at least one of the first process operation or the second process operation; and modifying, by the process coordinator service, the transaction data based at least in part on the update data.

In Example 8, the subject matter of any one or more of Examples 1-7 optionally includes the executing of the first process operation resulting in first process operation result data, and the accessing of the first backend system comprising writing the first process operation result data to the first backend system.

In Example 9, the subject matter of any one or more of Examples 1-8 optionally includes the accessing of the second backend system comprising reading operation data from the second backend system.

Example 10 is a method for executing transactions in a hybrid computing environment, the method comprising: executing a volume transaction engine in a cloud platform deployment, the volume transaction engine comprising an orchestrator service and an integration manager service; receiving, by the volume transaction engine, first transaction request data from a first transaction platform application, the first transaction request data describing a first transaction; selecting, by the orchestrator service, transaction description data describing a plurality of process operations for executing the first transaction, the transaction description data describing a first process operation and a second process operation; executing the first process operation by the volume transaction engine, the executing of the first process operation comprising accessing a first backend system executing at the cloud platform deployment; writing, by the integration manager service, first object identifier data to a persistence associated with the volume transaction engine, the first object identifier data describing the accessing of the first backend system; executing the second process operation by the volume transaction engine, the executing of the second process operation comprising accessing a second backend system executed by an on-premise computing system; and writing, by the integration manager service, second object identifier data to the persistence associated with the volume transaction engine, the second object identifier data describing the accessing of the first backend system.

In Example 11, the subject matter of Example 10 optionally includes wherein the volume transaction engine further comprises a scheduler service, and wherein the transaction description data further describes a third process operation and a fourth process operation, the method further comprising: determining, by the scheduler service, a scheduled time for the third process operation and a scheduled time for the fourth process operation; executing the third process operation, by the volume transaction engine; determining, by the scheduler service, that the third process operation has failed to complete before the scheduled time for the fourth process operation; and writing exception ticket data to the persistence associated with the volume transaction engine, the exception ticket data describing the third process operation and the fourth process operation.

In Example 12, the subject matter of Example 11 optionally includes receiving, by the volume transaction engine, a request to re-execute the first transaction; accessing, by the orchestrator service, the first object identifier data, the second object identifier data, and the exception ticket data; using, by the orchestrator service, the first object identifier data, the second object identifier data, and the exception ticket data, to select the third process operation for execution; and executing, by the volume transaction engine, the third process operation.

In Example 13, the subject matter of any one or more of Examples 10-12 optionally includes the first transaction request data being received by the orchestrator service via a transaction engine application programming interface (API).

In Example 14, the subject matter of any one or more of Examples 10-13 optionally includes receiving, by the volume transaction engine, second transaction request data from a second transaction platform application, the second transaction request data describing a second transaction.

In Example 15, the subject matter of any one or more of Examples 10-14 optionally includes the volume transaction engine further comprising a process coordinator service, the method further comprising: receiving, by the process coordinator service, input data from an administrative user; and generating, by the process coordinator service, the transaction description data based at least in part on the input data.

In Example 16, the subject matter of any one or more of Examples 10-15 optionally includes receiving, by a process coordinator service, update data from an administrative user, the update data describing a change to at least one of the first process operation or the second process operation; and modifying, by the process coordinator service, the transaction description data based at least in part on the update data.

In Example 17, the subject matter of any one or more of Examples 10-16 optionally includes the executing of the first process operation resulting in first process operation result data, and the accessing of the first backend system comprising writing the first process operation result data to the first backend system.

In Example 18, the subject matter of any one or more of Examples 10-17 optionally includes the accessing of the second backend system comprising reading operation data from the second backend system.

Example 19 is a non-transitory machine-readable medium comprising instructions thereon that, when executed by at least one processor, cause the at least one processor to perform operations comprising: executing a volume transaction engine in a cloud platform deployment, the volume transaction engine comprising an orchestrator service and an integration manager service; receiving first transaction request data from a first transaction platform application, the first transaction request data describing a first transaction; selecting transaction description data describing a plurality of process operations for executing the first transaction, the transaction description data describing a first process operation and a second process operation; executing the first process operation, the executing of the first process operation comprising accessing a first backend system executing at the cloud platform deployment; writing first object identifier data to a persistence associated with the volume transaction engine, the first object identifier data describing the accessing of the first backend system; executing the second process operation, the executing of the second process operation comprising accessing a second backend system executed by an on-premise computing system; and writing second object identifier data to the persistence associated with the volume transaction engine, the second object identifier data describing the accessing of the first backend system.

In Example 20, the subject matter of Example 19 optionally includes wherein the volume transaction engine further comprises a scheduler service, and wherein the transaction description data further describes a third process operation and a fourth process operation, the operations further comprising: determining, by the scheduler service, a scheduled time for the third process operation and a scheduled time for the fourth process operation; executing the third process operation, by the volume transaction engine; determining, by the scheduler service, that the third process operation has failed to complete before the scheduled time for the fourth process operation; and writing exception ticket data to the persistence associated with the volume transaction engine, the exception ticket data describing the third process operation and the fourth process operation.

Figure 6:
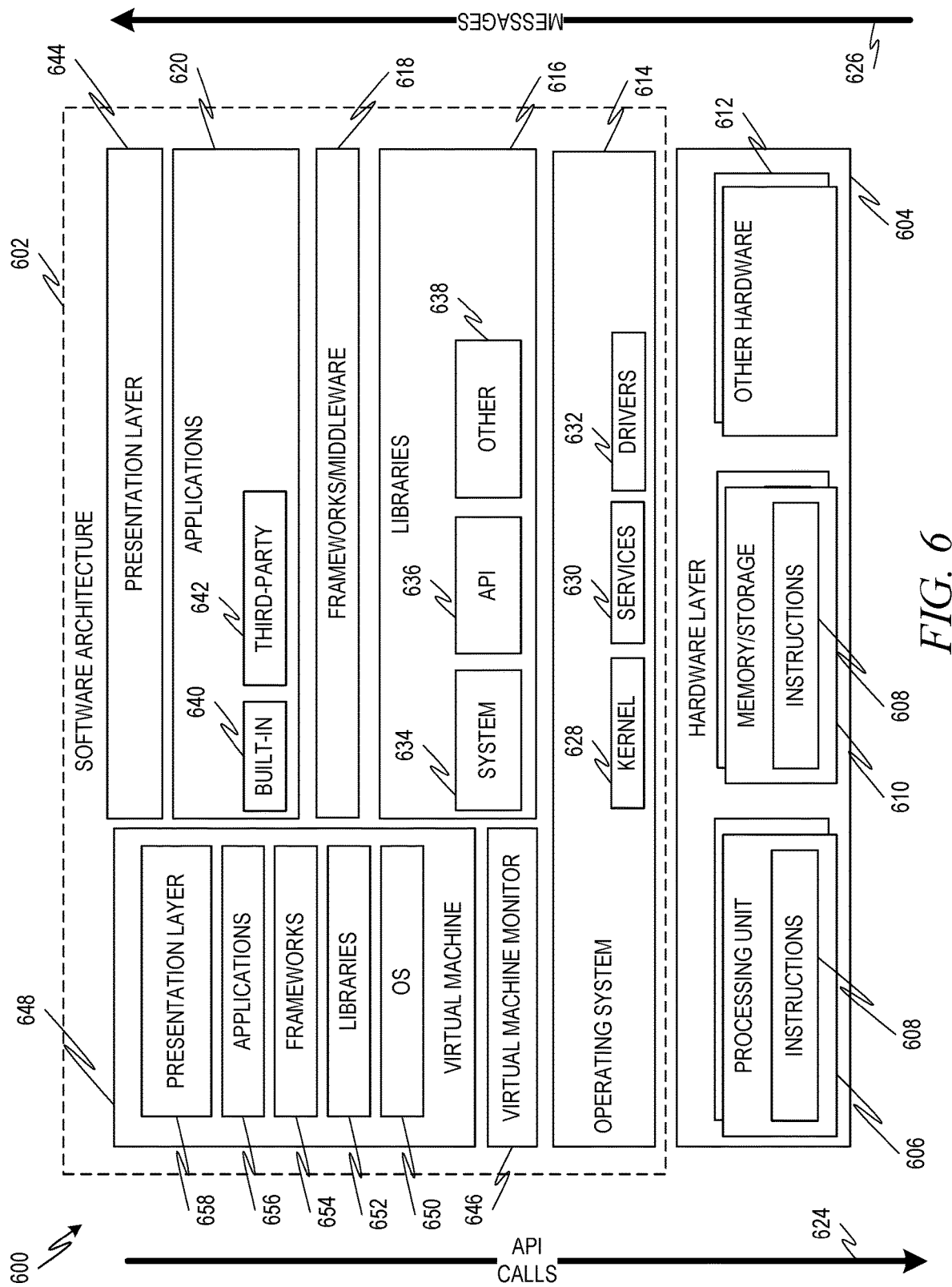
FIG. 6 is a block diagram showing one example of a software architecture for a computing device.

FIG. 6 is a block diagram 600 showing one example of a software architecture 602 for a computing device. The architecture 602 may be used in conjunction with various hardware architectures, for example, as described herein. FIG. 6 is merely a non-limiting example of a software architecture and many other architectures may be implemented to facilitate the functionality described herein. A representative hardware layer 604 is illustrated and can represent, for example, any of the above referenced computing devices. In some examples, the hardware layer 604 may be implemented according to the architecture of the computer system of FIG. 6.

The representative hardware layer 604 comprises one or more processing units 606 having associated executable instructions 608. Executable instructions 608 represent the executable instructions of the software architecture 602, including implementation of the methods, modules, subsystems, and components, and so forth described herein and may also include memory and/or storage modules 610, which also have executable instructions 608. Hardware layer 604 may also comprise other hardware as indicated by other hardware 612 which represents any other hardware of the hardware layer 604, such as the other hardware illustrated as part of the architecture 602.

In the example architecture of FIG. 6, the software architecture 602 may be conceptualized as a stack of layers where each layer provides particular functionality. For example, the software architecture 602 may include layers such as an operating system 614, libraries 616, frameworks/middleware 618, applications 620, and presentation layer 644. Operationally, the applications 620 and/or other components within the layers may invoke API calls 624 through the software stack and access a response, returned values, and so forth illustrated as messages 626 in response to the API calls 624. The layers illustrated are representative in nature and not all software architectures have all layers. For example, some mobile or special purpose operating systems may not provide a frameworks/middleware layer 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. In some examples, the services 630 include an interrupt service. The interrupt service may detect the receipt of an interrupt and, in response, cause the architecture 602 to pause its current processing and execute an interrupt service routine (ISR) when an interrupt is accessed.

The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) may provide a higher-level common infrastructure that may be utilized by the applications 620 and/or other software components/modules. For example, the frameworks 618 may provide various graphic user interface (GUI) functions, high-level resource management, high-level location services, and so forth. The frameworks 618 may provide a broad spectrum of other APIs that may be utilized by the applications 620 and/or other software components/modules, some of which may be specific to a particular operating system or platform.

The applications 620 includes built-in applications 640 and/or third-party applications 642. Examples of representative built-in applications 640 may include, but are not limited to, a contacts application, a browser application, a book reader application, a location application, a median application, a messaging application, and/or a game application. Third-party applications 642 may include any of the built-in applications 640 as well as a broad assortment of other applications. In a specific example, the third-party application 642 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third-party application 642 may invoke the API calls 624 provided by the mobile operating system such as operating system 614 to facilitate functionality described herein.

The applications 620 may utilize built-in operating system functions (e.g., kernel 628, services 630, and/or drivers 632), libraries (e.g., system libraries 634, API libraries 636, and other libraries 638), and frameworks/middleware 618 to create user interfaces to interact with users of the system. Alternatively, or additionally, in some systems interactions with a user may occur through a presentation layer, such as presentation layer 644. In these systems, the application/module "logic" can be separated from the aspects of the application/module that interact with a user.

Some software architectures utilize virtual machines. In the example of FIG. 6, this is illustrated by virtual machine 648. A virtual machine creates a software environment where applications/modules can execute as if they were executing on a hardware computing device. A virtual machine is hosted by a host operating system (operating system 614) and typically, although not always, has a virtual machine monitor 646, which manages the operation of the virtual machine 648 as well as the interface with the host operating system (i.e., operating system 614). A software architecture executes within the virtual machine 648 such as an operating system 650, libraries 652, frameworks/middleware 654, applications 656 and/or presentation layer 658. These layers of software architecture executing within the virtual machine 648 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 7:
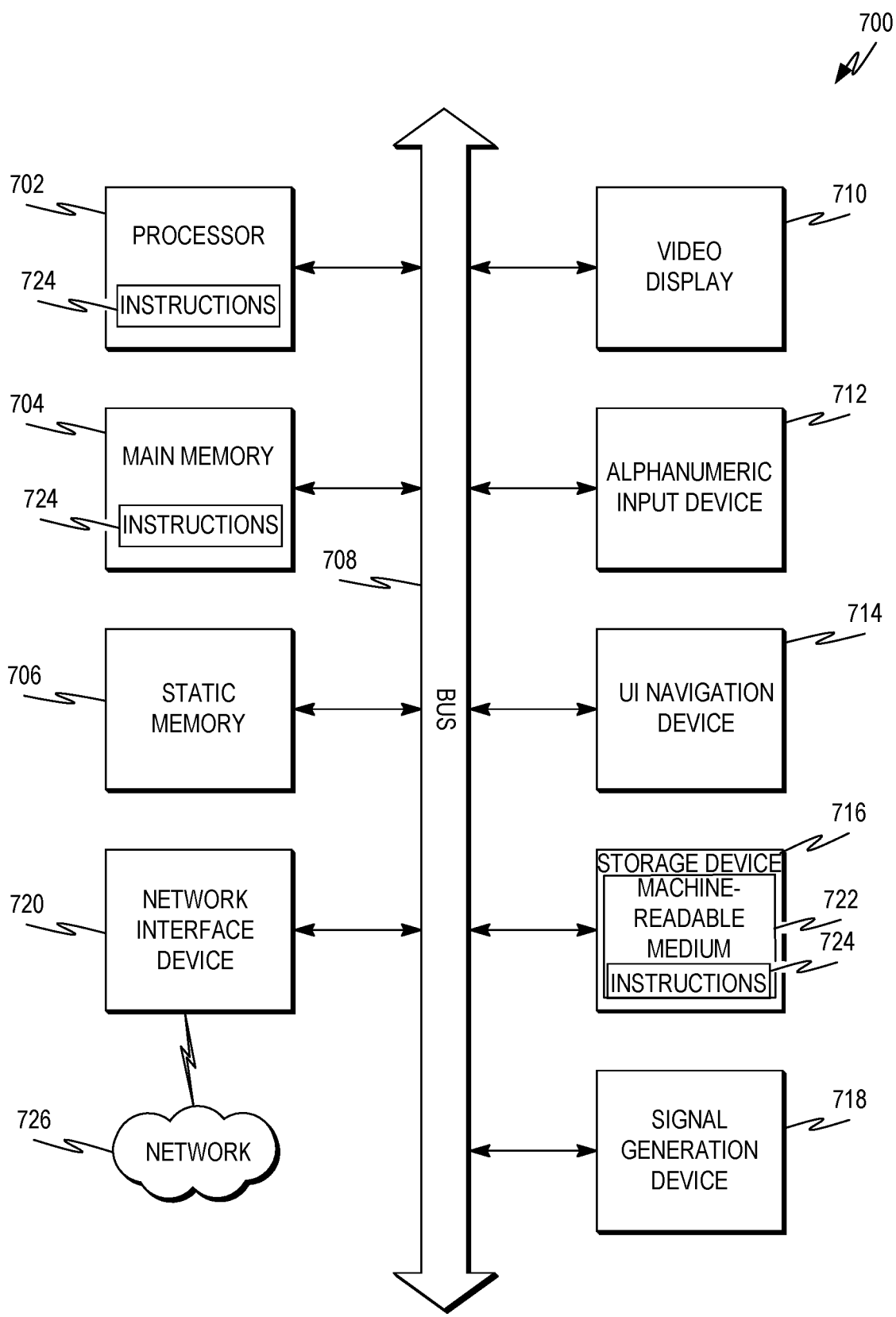
FIG. 7 is a block diagram of a machine in the example form of a computer system within which instructions may be executed for causing the machine to perform any one or more of the methodologies discussed herein.

FIG. 7 is a block diagram of a machine in the example form of a computer system 700 within which instructions 724 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a user interface (UI) navigation (or cursor control) device 714 (e.g., a mouse), a disk drive unit 716, a signal generation device 718 (e.g., a speaker), and a network interface device 720.

Machine-Readable Medium

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media 722.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding, or carrying instructions 724 for execution by the machine and that cause the machine to perform any one or more of the methodologies of the present disclosure, or that is capable of storing, encoding, or carrying data structures utilized by or associated with such instructions 724. The term "machine-readable medium" shall accordingly be taken to include, but not be limited to, solid-state memories, and optical and magnetic media. Specific examples of machine-readable media 722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 724 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system, comprising:
a cloud platform deployment comprising at least one processor programmed to execute a volume transaction engine to perform operations comprising:
receiving, by a process coordinator service of the volume transaction engine, input data or update input data describing a change to at least one of a first process operation of a plurality of process operations for executing a first transaction or a second process operation of the plurality of process operations for executing the first transaction, the second process operation being received from an administrative user;

generating or modifying, by the process coordinator service, a transaction description data based at least in part on the input data or updated input data from the administrative user;

receiving, by an orchestrator service of the volume transaction engine, first transaction request data from a first transaction platform application and second transaction request data from a second transaction platform application, the first transaction request data describing the first transaction and the second transaction request data describing a second transaction;

selecting, by the orchestrator service, transaction description data describing the plurality of process operations for executing the first transaction, the transaction description data indicating that the first process operation is to be performed at a first backend system executing at the cloud platform deployment and that the second process operation is to be performed at a second backend system executed by an on-premise computing system;

determining, by a scheduler service of the volume transaction engine, a scheduled time for the first process operation at the first backend system and a scheduled time for the second process operation at the second backend system;

executing the first process operation at the scheduled time for the first process operation, the executing of the first process operation resulting in first process operation result data, and the executing of the first process operation comprising:
 accessing, by an integration manager service of the volume transaction engine, the first backend system executing at the cloud platform deployment; and
 writing, by the integration manager service, first object identifier data from the first process operation result data to a persistence associated with the volume transaction engine, the first object identifier data describing the accessing of the first backend system; and executing the second process operation at the scheduled time for the second process operation, the executing of the second process operation comprising:
 accessing, by the integration manager service, the second backend system executed by the on-premise computing system; and
 writing, by the integration manager service, second object identifier data to the persistence associated with the volume transaction engine, the second object identifier data describing the accessing of the second backend system, the accessing of the second backend system comprising reading operation data from the second backend system.

2. The system of claim 1, wherein the transaction description data further describes a third process operation and a fourth process operation, the operations further comprising:
 determining, by the scheduler service, a scheduled time for the third process operation and a scheduled time for the fourth process operation;
 executing the third process operation, by the volume transaction engine;
 determining, by the scheduler service, that the third process operation has failed to complete before the scheduled time for the fourth process operation; and
 writing exception ticket data to the persistence associated with the volume transaction engine, the exception ticket data describing the third process operation and the fourth process operation.

3. The system of claim 2, the operations further comprising:
 receiving, by the volume transaction engine, a request to re-execute the first transaction;
 accessing, by the volume transaction engine, the first object identifier data, the second object identifier data, and the exception ticket data;
 using, by the volume transaction engine, the first object identifier data, the second object identifier data, and the exception ticket data, to select the third process operation for execution; and
 executing, by the volume transaction engine, the third process operation.

4. The system of claim 1, the first transaction request data being received by the volume transaction engine via a transaction engine application programming interface (API).

5. A method for executing transactions in a hybrid computing environment, the method comprising:
 executing a volume transaction engine in a cloud platform deployment, the volume transaction engine comprising an orchestrator service, a scheduler service, a process coordinator service, and an integration manager service;
 receiving, by the process coordinator service, input data or update input data describing a change to at least one of a first process operation of a plurality of process operations for executing a first transaction or a second process operation of the plurality of process operations for executing the first transaction, the second process operation being received from an administrative user;
 generating or modifying, by the process coordinator service, a transaction description data based at least in part on the input data or updated input data from the administrative user;
 receiving, by the orchestrator service, first transaction request data from a first transaction platform application and second transaction request data from a second transaction platform application, the first transaction request data describing the first transaction and the second transaction request data describing a second transaction;
 selecting, by the orchestrator service, transaction description data describing the plurality of process operations for executing the first transaction, the transaction description data indicating that the first process operation is to be performed at a first backend system executing at the cloud platform deployment and that the second process operation is to be performed at a second backend system executed by an on-premise computing system;
 determining, by the scheduler service, a scheduled time for the first process operation at the first backend system and a scheduled time for the second process operation at the second backend system;
 executing the first process operation by the volume transaction engine at the scheduled time for the first process operation, the executing of the first process operation resulting in first process operation result data, and the executing of the first process operation comprising:
  accessing, by the integration manager service, the first backend system executing at the cloud platform deployment; and
  writing, by the integration manager service, first object identifier data from the first process operation result data to a persistence associated with the volume transaction engine, the first object identifier data describing the accessing of the first backend system; and executing the second process operation by the volume transaction engine at the scheduled time for the second process operation, the executing of the second process operation comprising:
  accessing, by the integration manager service, the second backend system executed by the on-premise computing system; and
  writing, by the integration manager service, second object identifier data to the persistence associated with the volume transaction engine, the second object identifier data describing the accessing of the second backend system, the accessing of the second backend system comprising reading operation data from the second backend system.

6. The method of claim 5, wherein the transaction description data further describes a third process operation and a fourth process operation, the method further comprising:
  determining, by the scheduler service, a scheduled time for the third process operation and a scheduled time for the fourth process operation;
  executing the third process operation, by the volume transaction engine;
  determining, by the scheduler service, that the third process operation has failed to complete before the scheduled time for the fourth process operation; and
  writing exception ticket data to the persistence associated with the volume transaction engine, the exception ticket data describing the third process operation and the fourth process operation.

7. The method of claim 6, further comprising:
  receiving, by the volume transaction engine, a request to re-execute the first transaction;
  accessing, by the orchestrator service, the first object identifier data, the second object identifier data, and the exception ticket data;
  using, by the orchestrator service, the first object identifier data, the second object identifier data, and the exception ticket data, to select the third process operation for execution; and
  executing, by the volume transaction engine, the third process operation.

8. The method of claim 5, the first transaction request data being received by the orchestrator service via a transaction engine application programming interface (API).

9. A non-transitory machine-readable medium comprising instructions thereon that, when executed by at least one processor, cause the at least one processor to perform operations comprising:
  executing a volume transaction engine in a cloud platform deployment, the volume transaction engine comprising an orchestrator service, a scheduler service, a process coordinator service, and an integration manager service;
  receiving, by the process coordinator service, input data or update input data describing a change to at least one of a first process operation of a plurality of process operations for executing a first transaction or a second process operation of the plurality of process operations for executing the first transaction, the second process operation being received from an administrative user:
  generating or modifying, by the process coordinator service, a transaction description data based at least in part on the input data or updated input data from the administrative user;
  receiving, by the orchestrator service, first transaction request data from a first transaction platform application and second transaction request data from a second transaction platform application, the first transaction request data describing the first transaction and the second transaction request data describing a second transaction;
  selecting, by the orchestrator service, transaction description data describing the plurality of process operations for executing the first transaction, the transaction description data indicating that the first process operation is to be performed at a first backend system executing at the cloud platform deployment and that the second process operation is to be performed at a second backend system executed by an on-premise computing system;
  determining, by the scheduler service, a scheduled time for the first process operation at the first backend system and a scheduled time for the second process operation at the second backend system;
  executing the first process operation at the scheduled time for the first process operation, the executing of the first process operation resulting in first process operation result data, and the executing of the first process operation comprising:
    accessing, by the integration manager service, a first backend system executing at the cloud platform deployment; and
    writing, by the integration manager service, first object identifier data from the first process operation result data to a persistence associated with the volume transaction engine, the first object identifier data describing the accessing of the first backend system; and
  executing the second process operation at the scheduled time for the second process operation, the executing of the second process operation comprising:
    accessing, by the integration manager service, a second backend system executed by an on-premise computing system; and
    writing second object identifier data to the persistence associated with the volume transaction engine, the second object identifier data describing the accessing, by the integration manager service, of the second backend system, the accessing of the second backend system comprising reading operation data from the second backend system.

10. The non-transitory machine-readable medium of claim 9, wherein the transaction description data further describes a third process operation and a fourth process operation, the operations further comprising:
  determining, by the scheduler service, a scheduled time for the third process operation and a scheduled time for the fourth process operation;
  executing the third process operation, by the volume transaction engine;
  determining, by the scheduler service, that the third process operation has failed to complete before the scheduled time for the fourth process operation; and
  writing exception ticket data to the persistence associated with the volume transaction engine, the exception ticket data describing the third process operation and the fourth process operation.

* * * * *